United States Patent
Yokota et al.

(10) Patent No.: US 7,427,022 B2
(45) Date of Patent: Sep. 23, 2008

(54) TICKET MANAGEMENT SYSTEM, TERMINAL DEVICE, TICKET MANAGEMENT SERVER, REGISTER DEVICE, VALUE CONVERSION METHOD, COMPUTER PROGRAM, AND RECORDING MEDIUM

(75) Inventors: Kaoru Yokota, Hyogo (JP); Motoji Ohmori, Osaka (JP); Hisashi Takayama, Tokyo (JP); Atsushi Saso, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1 day.

(21) Appl. No.: 10/594,060

(22) PCT Filed: Mar. 31, 2005

(86) PCT No.: PCT/JP2005/006326

§ 371 (c)(1),
(2), (4) Date: Sep. 25, 2006

(87) PCT Pub. No.: WO2005/096201

PCT Pub. Date: Mar. 31, 2005

(65) Prior Publication Data

US 2007/0175979 A1 Aug. 2, 2007

(30) Foreign Application Priority Data

Apr. 1, 2004 (JP) .............................. 2004-109136

(51) Int. Cl.
*G06K 7/08* (2006.01)

(52) U.S. Cl. ........................ 235/381; 235/384; 235/487

(58) Field of Classification Search ................. 235/381, 235/380, 382, 487, 375; 705/1
See application file for complete search history.

(56) References Cited

U.S. PATENT DOCUMENTS

| 5,953,705 | A | * | 9/1999 | Oneda ........................... 705/5 |
| 6,155,484 | A | | 12/2000 | Sasaki |
| 6,402,027 | B1 | | 6/2002 | Sasaki |
| 6,857,562 | B2 | | 2/2005 | Sasaki |
| 7,119,662 | B1 | * | 10/2006 | Horiguchi et al. ............ 340/5.7 |
| 2002/0092904 | A1 | | 7/2002 | Sasaki |

(Continued)

FOREIGN PATENT DOCUMENTS

JP 11-143976 5/1999

(Continued)

*Primary Examiner*—Edwyn Labaze
(74) *Attorney, Agent, or Firm*—Wenderoth, Lind & Ponack, L.L.P.

(57) ABSTRACT

A ticket management system is provided which can perform adjustments using a ticket to which non-updatable value information is assigned together with an electronic value, according to a payment form. The ticket management system includes an IC tag attached to a money ticket, a money ticket management server and a mobile terminal. The IC tag holds a money ticket ID for identifying the money ticket and reads the money ticket ID. The money ticket management server includes a storage unit, receives the money ticket ID from the mobile terminal and writes a valid money ticket ID to the storage unit. The mobile terminal includes a storage unit, acquires the money ticket ID held in the IC tag, transmits the acquired money ticket ID to the money ticket management server, and writes amount information of the money ticket identified by the valid money ticket ID to the storage unit.

22 Claims, 7 Drawing Sheets

U.S. PATENT DOCUMENTS

| | | | |
|---|---|---|---|
| 2004/0249759 A1 * | 12/2004 | Higashi et al. | 705/59 |
| 2005/0207378 A1 * | 9/2005 | Zaitsu | 370/338 |
| 2006/0143036 A1 * | 6/2006 | Kato | 705/1 |

FOREIGN PATENT DOCUMENTS

| | | |
|---|---|---|
| JP | 2000-3399 | 1/2000 |
| JP | 2001-260580 | 9/2001 |
| JP | 2002-92742 | 3/2002 |
| JP | 2002-109210 | 4/2002 |
| JP | 2002-207970 | 7/2002 |
| JP | 2003-123011 | 4/2003 |

* cited by examiner

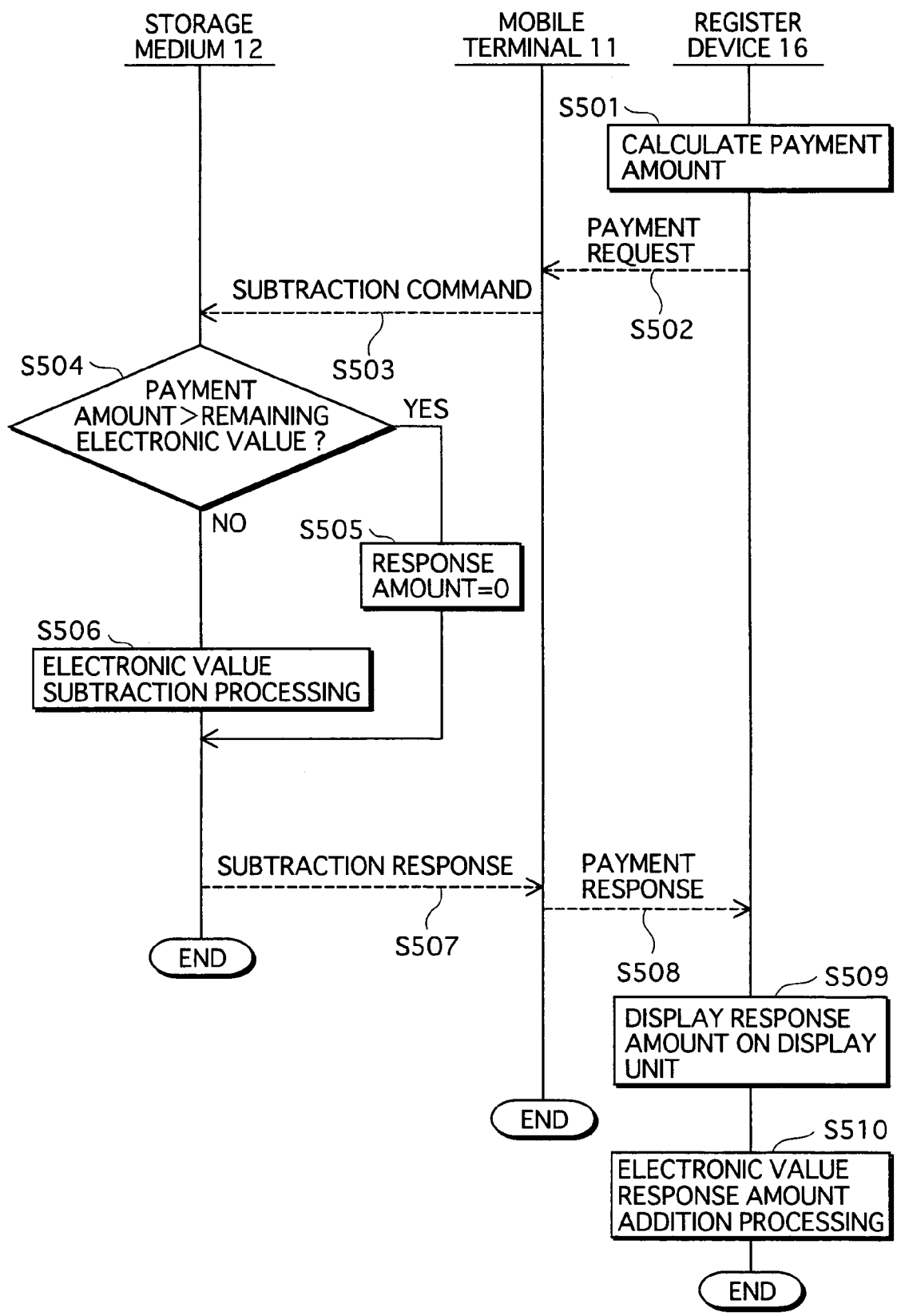

TICKET MANAGEMENT SYSTEM, TERMINAL DEVICE, TICKET MANAGEMENT SERVER, REGISTER DEVICE, VALUE CONVERSION METHOD, COMPUTER PROGRAM, AND RECORDING MEDIUM

BACKGROUND OF THE INVENTION

1. Field of the Invention

The present invention relates to a ticket management system for commerce using a ticket such as a money ticket and an electronic value, and specifically to a technique of using the ticket together with the electronic value.

2. Description of the Related Art

Recently, information relating to an amount of money and the like can be sent and received via a communication line. Since an electronic value is treatable easily compared with a prepaid card, a banknote, a money ticket, and the like, use of the electronic value is becoming widespread. However, the prepaid card, the banknote, the money ticket, and the like are also still used together with the electronic value.

As an art for more convenient use of the electronic value, Japanese Patent Application Publication No. 2000-003399 discloses a system for transferring a prepaid value from a prepaid card to an electronic money card, and updating a prepaid value on the prepaid card by subtracting the transferred prepaid value. According to this art, adjustment can be performed with one electronic money card, using both of a prepaid value and an electronic value prestored on the electronic money card.

However, the above system has an inconvenient problem. Different from a prepaid card, a ticket such as a paper money ticket and a coupon ticket has assigned thereto non-updatable value information. Hence, adjustment cannot be performed using the ticket together with the electronic value.

For example, suppose a user desires to purchase a book using a personal computer and the like, via a network. The user has an electronic value less than a price of the book. Even if a total of a face value of his book coupon and the electronic value exceeds the price of the book, the user cannot purchase the book. This causes inconvenience.

In view of the above problem, the present invention aims to provide a useful ticket management system that can perform adjustment using a ticket such as a money ticket together with an electronic value.

BRIEF SUMMARY OF THE INVENTION

In order to solve the above problem, the present invention is a ticket management system including a terminal device and a ticket management server, where the terminal device includes: an electronic value storage unit storing an electronic value; an acquisition unit operable to acquire, from a ticket to which non-updatable value information is assigned, identification information which identifies the ticket; a transmission unit operable to transmit an electronization request including the acquired identification information to the ticket management server; and a value update unit operable to update the electronic value stored in the electronic value storage unit, by adding an electronic value shown by the value information assigned to the ticket identified by the identification information. The ticket management server includes: a status storage unit storing the identification information and status information showing whether the ticket identified by the identification information has been electronized, in correspondence with each other; a reception unit operable to receive the electronization request from the terminal device; and a change unit operable to, when the status information corresponding to the identification information included in the electronization request shows that the ticket has not been electronized, change the status information to show that the ticket has been electronized.

According to the above structure, the ticket management system of the present invention can convert value information assigned to a ticket into an electronic value with no overlap.

A terminal device of the present invention is a terminal device for converting a ticket to which non-updatable value information is assigned into an electronic value, and being used with a ticket management server which manages electronization of the ticket identified by identification information, and includes: an electronic value storage unit storing the electronic value; an acquisition unit operable to acquire the identification information which identifies the ticket from the ticket; a transmission unit operable to transmit an electronization request including the acquired identification information to the ticket management server; and a value update unit operable to update the electronic value stored in the electronic value storage unit, by adding an electronic value shown by the value information assigned to the ticket identified by the identification information.

According to this structure, value information assigned to a ticket can be converted into an electronic value with no overlap.

Also, the value update unit may include: a write judgment unit operable to judge whether the ticket identified by the acquired identification information is valid; a value acquisition unit operable to, when the ticket is judged as valid, acquire the electronic value shown by the value information assigned to the ticket; and a value update unit operable to update the electronic value stored in the electronic value storage unit, by adding the acquired electronic value.

According to this structure, electronic value conversion can be limited to only a valid ticket, and conversion of an invalid ticket into an electronic value can be prevented.

Also, the write judgment unit may include: a receiving unit operable to receive electronization information showing whether the ticket identified by the identification information has been electronized, from the ticket management server; and a determination unit operable to, when the electronization information shows that the ticket has not been electronized, determine the ticket as valid.

According to this structure, re-electronization of a ticket which has been converted into an electronic value can be prevented, based on the information managed by the server.

Also, judgment information based on the identification information may be stored on the ticket, the write judgment unit may include: a judgment information acquisition unit operable to acquire the judgment information; and a determination unit operable to, when the identification information coincides with the judgment information, determine the ticket as valid.

According to this structure, a ticket is judged as valid only when specific identification information coincides with judgment information, thereby discriminating a valid ticket from an invalid ticket such as a copied ticket.

Also, the judgment information may be stored on the ticket in a bar code format, and the judgment information acquisition unit may acquire the judgment information stored in the bar code format.

According to this structure, a ticket is judged as valid only when specific identification information coincides with judgment information stored in the bar code format, thereby discriminating a valid ticket from an invalid ticket such as a copied ticket.

Also, the value acquisition unit may include: a request unit operable to, when the ticket is judged as valid, request the ticket management server to notify the value information assigned to the ticket by transmitting a notification request including the identification information, and a response acquisition unit operable to receive, as a response to the notification request, the value information from the ticket management server, and acquire the electronic value shown by the value information.

According to this structure, the system can be structured using a ticket on which value information is not stored.

Also, the ticket management server can collectively manage value information.

Also, the identification information may include the value information assigned to the ticket, and the value acquisition unit, when the ticket is judged as valid, may extract the value information from the identification information, and acquire the electronic value shown by the value information.

According to this structure, amount information can be acquired from identification information without inquiring of the ticket management server.

Also, the ticket may include a storage device storing the identification information which identifies the ticket, and the acquisition unit may acquire the identification information stored on the storage device.

Also, the storage device may be an IC tag storing the identification information, and the acquisition unit may acquire the identification information stored on the IC tag.

Also, the identification information may be stored on the ticket in a bar code format, and the acquisition unit may acquire the identification information stored in the bar code format.

According to this structure, identification information which identifies a ticket is acquired from the ticket, thereby discriminating the ticket.

Also, the terminal device may further include: an invalidation identification acquisition unit operable to acquire identification information which identifies an invalid ticket; an invalid value acquisition unit operable to acquire an invalid value that is an electronic value shown by value information assigned to the invalid ticket identified by the acquired identification information; a balance judgment unit operable to judge whether the invalid value is no more than the electronic value stored in the electronic value storage unit; a validation request transmission unit operable to, when the invalid value is judged as no more than the electronic value stored in the electronic value storage unit, transmit a validation request of the ticket to the ticket management server; an authorization reception unit operable to receive authorization information for authorizing to validate the ticket from the ticket management server; and a subtraction unit operable to, when the authorization information is received, subtract the invalid value from the electronic value stored in the electronic value storage unit.

According to this structure, unauthorized processing of validating a ticket having an amount greater than an electronic value can be prevented.

Also, the terminal device may be realized by a communication device and a storage medium, and the communication device may include the acquisition unit, the transmission unit, and the value update unit, and the storage medium may include the electronic value storage unit.

According to this structure, the terminal device can be structured separating the communication device and the storage medium.

This enables to easily structure a new terminal device by exchanging only the communication device, with electronic money held in the storage medium.

A ticket management server of the present invention is a ticket management server which manages a status of a ticket to which non-updatable value information is assigned, and includes: a status storage unit storing identification information which identifies the ticket and status information showing whether the ticket identified by the identification information has been electronized, in correspondence with each other; a reception unit operable to receive an electronization request including the identification information of the ticket, from a terminal device; and a change unit operable to, when the ticket identified by the identification information included in the electronization request is valid, change the status information corresponding to the identification information stored in the status storage unit, to show that the ticket has been electronized.

According to this structure, the ticket management server can collectively manage identification information of a valid ticket.

Also, the change unit may include: a judgment unit operable to judge whether the status information stored in the status storage unit corresponding to the identification information included in the electronization request shows that the ticket has been electronized, and a changing unit operable to, when the ticket is judged as not having been electronized, determine the identification information as valid, and change the status information to show that the ticket has been electronized.

According to this structure, re-attachment of an electronic value to a ticket which has been converted into an electronic value can be prevented.

Also, the ticket management server may further include: a validation request receiving unit operable to receive a ticket validation request including identification information of an invalid ticket from the terminal device; an electronization judgment unit operable to judge whether status information corresponding to the identification information included in the validation request shows that the ticket has been electronized; a ticket validation unit operable to, when the status information shows that the ticket has been electronized, change the status information to show that the ticket has not been electronized; and an authorization transmission unit operable to, when the status information shows that the ticket has been electronized, transmit authorization information showing authorization to validate the ticket to the terminal device.

According to this structure, an invalid ticket which has been electronized can be converted into a valid ticket for use again.

A register device of the present invention is a register device for adjusting a payment amount, and being used with a ticket management server which manages validity of a money ticket and a terminal device, and includes: a calculation unit operable to calculate the payment amount; a holding unit operable to hold a money ticket ID for identifying the money ticket and amount information showing an amount of the money ticket, in correspondence with each other; an acquisition unit operable to acquire, from an IC tag attached to the money ticket, the money ticket ID for identifying the money ticket; an inquiry unit operable to inquire of the ticket management server whether the acquired money ticket ID is valid; a receiving unit operable to receive a response showing whether the money ticket identified by the acquired money ticket ID is valid, from the ticket management server; and a charging unit operable to, when the response shows that the money ticket is valid, charge the terminal device for an amount after subtracting the amount of the money ticket identified by the acquired the money ticket ID from the payment amount.

According to this structure, the register device can subtract a face value of a money ticket from a payment amount, and then charge the terminal device for the payment amount to perform adjustment.

A value conversion method of the present invention is a method used in a terminal device including an electronic value storage unit storing an electronic value and converts a ticket to which non-updatable value information is assigned into an electronic value, and includes steps of: acquiring identification information which identifies the ticket from the ticket; transmitting an electronization request including the acquired identification information to a ticket management server which manages electronization of the ticket; and updating the electronic value stored in the electronic value storage unit, by adding the electronic value shown by the value information assigned to the ticket identified by the identification information.

A computer program of the present invention is a computer program used in a terminal device including an electronic value storage unit storing an electronic value and converts a ticket to which non-updatable value information is assigned into an electronic value, and includes steps of: acquiring identification information which identifies the ticket from the ticket; transmitting an electronization request including the acquired identification information to a ticket management server which manages electronization of the ticket; and updating the electronic value stored in the electronic value storage unit, by adding the electronic value shown by the value information assigned to the ticket identified by the identification information.

A storage medium of the present invention is a computer readable storage medium storing the computer program.

According to this structure, value information assigned to a ticket can be converted into an electronic value with no overlap.

BRIEF DESCRIPTION OF THE DRAWINGS

FIG. 7 is a flowchart showing processing operation of performing adjustment using the electronic money ticket according to the embodiment of the present invention.

DETAILED DESCRIPTION OF THE INVENTION

An exemplary embodiment of the present invention will be described with reference to Figures.

Figure 1:
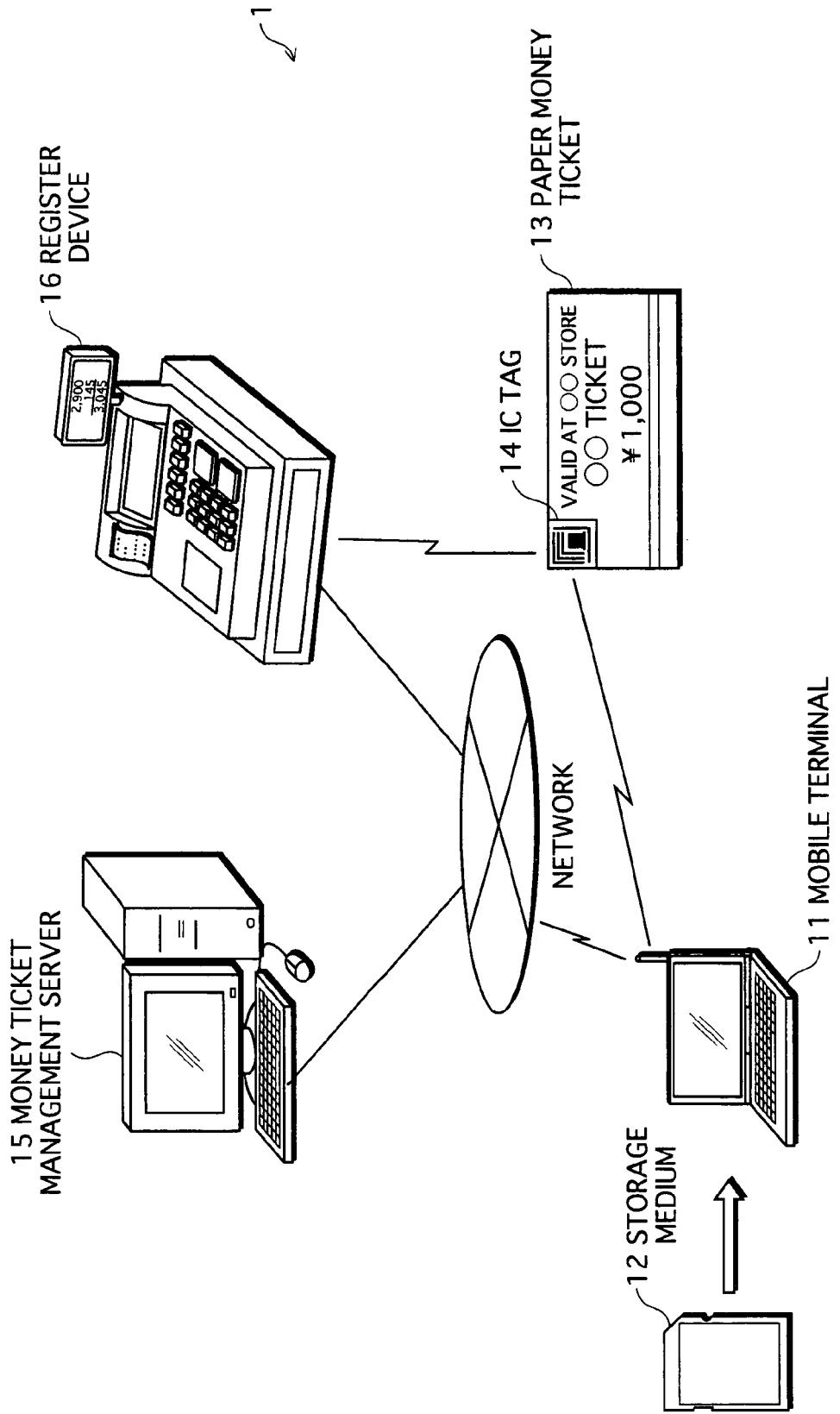
FIG. 1 is a schematic diagram showing a structure of an electronic money ticket management system according to an embodiment of the present invention.

FIG. 1 is a schematic diagram showing a structure of an electronic money ticket management system 1 according to the exemplary embodiment of the present invention.

The electronic money ticket management system 1 includes a mobile terminal 11, a storage medium 12, a paper money ticket 13, an IC tag 14, a money ticket management server 15, and a register device 16 as shown in FIG. 1.

The mobile terminal 11, the money ticket management server 15, and the register device 16 connect with each other via a network. The mobile terminal 11 and the register device 16 acquire information from the IC tag 14 using radio communications.

A user of the electronic money ticket management system 1 has the mobile terminal 11 and the paper money ticket 13. When purchasing commodities at a shop such as a supermarket where the register device 16 is installed, the user pays for the commodities using the mobile terminal 11 and the paper money ticket 13.

The storage medium 12 which stores amount information of electronic money (hereinafter referred to as "electronic value") is inserted into the mobile terminal 11.

The paper money ticket 13 is a ticket having a predetermined face value, such as a 1000 yen gift ticket. The IC tag 14 attached to the paper money ticket 13 holds a money ticket ID of the paper money ticket 13.

The register device 16 totals selling prices of the commodities the user desires to purchase to calculate a payment amount, holds an electronic value, and transmits an adjustment request of the payment amount to the mobile terminal 11 via the network.

The mobile terminal 11 receives the adjustment request of the payment amount from the register device 16. When the electronic value held in the storage medium 12 is equal to or greater than the payment amount requested for the adjustment, the mobile terminal 11 subtracts the payment amount from the electronic value held in the storage medium 12, and notifies the register device 16 of subtraction completion. The register device 16 adds the payment amount to the electronic value held therein. This completes the payment processing.

Here, when the electronic value held in the storage medium 12 is less than the payment amount, the mobile terminal 11 reloads the electronic value by converting the paper money ticket 13 into an electronic money ticket, to perform the payment processing.

The mobile terminal 11 reads the money ticket ID from the IC tag 14, and transmits the read money ticket ID to the money ticket management server 15 via the network.

The money ticket management server 15 holds the following as a database, in correspondence with each other: an issue ID equivalent to a money ticket ID; face value information of a money ticket identified by the issue ID; and status information showing whether the money ticket identified by the issue ID has been converted into an electronic money ticket or is treated as a paper money ticket. When the money ticket management server 15 stores the issue ID coinciding with the money ticket ID received from the mobile terminal 11, and status information corresponding to the issue ID shows that the money ticket identified by the issue ID has not been converted into an electronic money ticket, the money ticket management server 15 updates the corresponding status information so as to show that the money ticket identified by the issue ID has been converted into an electronic money ticket, and transmits face value information corresponding to the issue ID, to the mobile terminal 11.

The mobile terminal 11 adds an amount shown by the received face value information to the electronic value held in the storage medium 12, and then subtracts the payment amount from the electronic value, to perform the payment processing.

Also, upon the payment, instead of converting the paper money ticket 13 into the electronic money ticket as described above, the user may pass the paper money ticket 13 to a salesclerk who operates the register device 16.

In this case, the register device 16 reads the money ticket ID from the IC tag 14, and transmits the read money ticket ID to the money ticket management server 15 via the network.

The money ticket management server 15 transmits a response whether the money ticket identified by the money ticket ID has been converted into an electronic money ticket, and the face value information, to the register device 16.

When the paper money ticket 13 has not been converted into an electronic money ticket, the register device 16 subtracts an amount shown by the face value information from the payment amount, and transmits the adjustment request to the mobile terminal 11.

STRUCTURE

Figure 2:
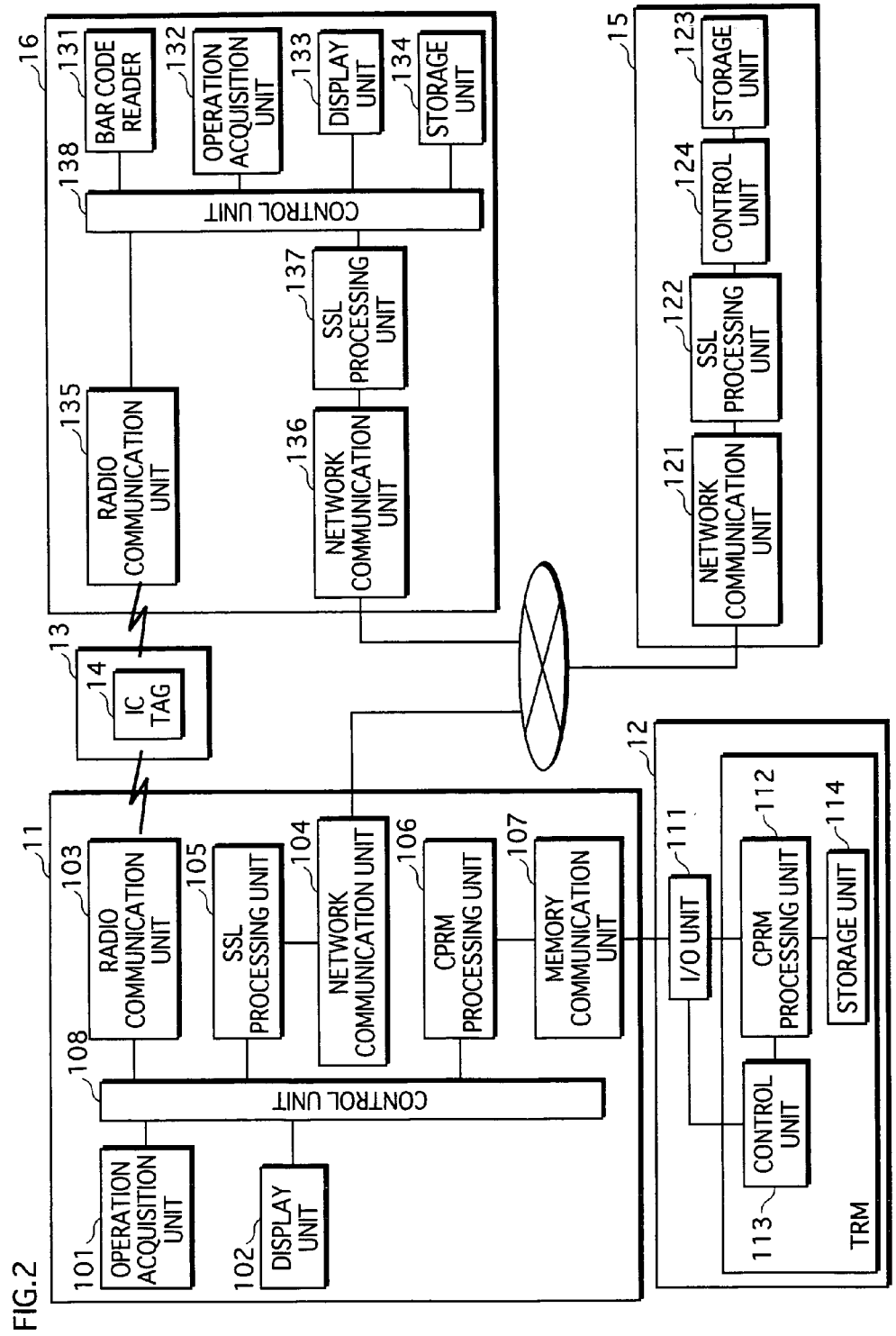
FIG. 2 is a block diagram showing the structure of the electronic money ticket management system according to the embodiment of the present invention.

FIG. 2 is a block diagram showing structures of the mobile terminal 11, the storage medium 12, the IC tag 14, the money ticket management server 15, and the register device 16.

<1.1. Mobile Terminal 11>

The mobile terminal 11 includes an operation acquisition unit 101, a display unit 102, a radio communication unit 103, a network communication unit 104, a SSL processing unit 105, a CPRM processing unit 106, a memory communication unit 107, and a control unit 108 as shown in FIG. 2. The mobile terminal 11 is specifically a computer system including a CPU (Central Processing Unit), a ROM (Read Only Memory), a RAM (Random Access Memory), a liquid-crystal display, a keypad, a communication interface, a card slot, and the like. A computer program is stored in the ROM. Functions of the mobile terminal 11 are realized by the CPU operating in accordance with the computer program.

The operation acquisition unit 101 includes a circuit that outputs a signal in accordance with a pressing of the keypad and a key, and transmits a user request, which is the signal in accordance with operation using the keypad by the user, to the control unit 108.

The user request includes an electronic money ticket conversion request, a paper money ticket conversion request, a status notification request, and the like, as well as a basic operation request of the mobile terminal 11, such as switching power-on/power-off.

The display unit 102 includes a liquid-crystal display and its drive circuit, and displays a GUI (Graphic User Interface), an error as a result of processing in response to the user request, and the like, based on instruction by the control unit 108.

The radio communication unit 103 is specifically a reader for an IC tag that performs radio communication using an electric wave of 13.56 MHz band. The radio communication unit 103 transmits an ID reading request to the IC tag 14, acquires an ID reading response as a response to the transmission, and notifies the control unit 108 of the acquired ID reading response, based on instruction by the control unit 108.

The network communication unit 104 is a communication interface that connects to the network by radio communication using PHS (Personal Handyphone System) and the like. The network communication unit 104 connects to the network by performing radio communication with a base station (not shown in the figure) that is set within a communication system.

The network communication unit 104, via the network, transmits data instructed by the control unit 108 to a destination instructed by the control unit 108, and transmits received data to the control unit 108.

The SSL processing unit 105, using SSL (Secure Sockets Layer), encrypts data to be sent by the network communication unit 104, and decrypts data received by the network communication unit 104.

Note that detail of the SSL is described in "*Secure Electronic Commerce, Second Edition: Building the Infrastructure for Digital Signatures and Encryption*" Warwick Ford and Michael S. Baum, Japanese translation by Shinichiro Yamada, PEARSON Education, 10 Oct., 2001, pp. 130-pp. 134.

The CPRM processing unit 106, based on CPRM (Content Protection for Recordable Media) format used for SD card standard, encrypts data to be sent to the storage medium 12 via the memory communication unit 107, and decrypts data received from the storage medium 12 via the memory communication unit 107.

Note that the CPRM is described in "*Matsushita Technical Journal Vol.* 48 No. 2" Matsushita Electric Industrial Co., Ltd., April, 2002, pp. 4-pp. 10.

The memory communication unit 107 is a reader/writer for a memory card, and performs data communication with the storage medium 12 based on control by the control unit 108.

The control unit 108 performs the following operations.

In order to make the following descriptions brief, though there is no explicit description, it is assumed that, the control unit 108 communicates: when communicating with the IC tag 14, via the radio communication unit 103; when communicating via the network, via the network communication unit 104 and the SSL processing unit 105; and when communicating with the storage medium 12, via the CPRM processing unit 106 and the memory communication unit 107.

(1) When acquiring any of the electronic money ticket conversion request, the paper money ticket conversion request, and the status notification request, from the operation acquisition unit 101, the control unit 108 keeps holding the acquired request, and instructs the radio communication unit 103 to transmit the ID reading request to the IC tag 14.

(2) When receiving the ID reading response including the money ticket ID from the radio communication unit 103, the control unit 108 transmits a processing request in response to the held request, to the money ticket management server 15.

When holding the electronic money ticket conversion request, the control unit 108 transmits an electronic money ticket conversion processing request using the money ticket ID as a parameter, to the money ticket management server 15. Likewise, when holding the paper money ticket conversion request, the control unit 108 transmits a paper money ticket conversion processing request using the money ticket ID as a parameter, to the money ticket management server 15. Also, when holding the status notification request, the control unit 108 transmits a status notification processing request using the money ticket ID as a parameter, to the money ticket management server 15.

(3) When receiving an electronic money ticket conversion response including the money ticket ID and a response amount that is information showing an amount, the control unit 108 judges whether the response amount is "0". When the response amount is "0", the control unit 108 instructs the display unit 102 to display an error showing that the electronic money ticket conversion cannot be performed. When the response amount is not "0", the control unit 108 transmits an addition command including the amount information showing the response amount to the storage medium 12.

Also, when receiving a paper money ticket conversion response including the money ticket ID and the response amount, the control unit 108 judges whether the response amount is "0". When the response amount is "0", the control unit 108 instructs the display unit 102 to display an error showing that the paper money ticket conversion cannot be performed. When the response amount is not "0", the control unit 108 transmits a subtraction command including the amount information showing the response amount to the storage medium 12.

Also, when receiving a status notification response including the money ticket ID, the response amount, and the status information, the control unit 108 instructs the display unit 102 to display the status information and the response amount.

The status information shows whether the money ticket identified by the money ticket ID is a paper money ticket or an electronic money ticket. The response amount shows an amount such as 1000 yen.

(4) When receiving a subtraction response including subtraction information as a parameter, the control unit 108 transmits a subtraction completion notification including the subtraction information as a parameter to the money ticket management server 15. The subtraction information shows either of subtraction success and subtraction failure.

(5) When receiving an addition request including the amount information as a parameter from the register device 16, the control unit 108 transmits an addition command including the amount information as a parameter to the storage medium 12.

(6) When receiving a payment request including the payment amount as a parameter from the register device 16, the control unit 108 transmits the subtraction command including the amount information showing the payment amount as a parameter to the storage medium 12.

Also, when receiving the subtraction response including the response amount from the storage medium 12, the control unit 108 transmits a payment response including the response amount to the register device 16.

<1.2. Storage Medium 12>

The storage medium 12 includes an I/O unit 111, a CPRM processing unit 112, a control unit 113, and a storage unit 114 as shown in FIG. 2, and specifically includes an IC (Integrated Circuit), a ROM, a RAM, and the like. Also, the storage medium 12 is a secure tamper-resistant memory card, and is inserted into a card slot included in the mobile terminal 11 to electrically connect with the mobile terminal 11.

The I/O unit 111 is an interface that communicates with the mobile terminal 11.

The CPRM processing unit 112, based on CPRM format, encrypts data to be sent to the mobile terminal 11 via the I/O unit 111, and decrypts data received from the mobile terminal 11 via the I/O unit 111.

In order to make subsequent descriptions brief, though there is no explicit description, it is assumed that, when communicating with the mobile terminal 11, the control unit 113 communicates via the CPRM processing unit 112 and the I/O unit 111.

When receiving the addition command including the amount information from the mobile terminal 11, the control unit 113 reads an electronic value held in the storage unit 114, adds an amount shown by the amount information included in the addition command to the read electronic value, and writes the added electronic value back to the storage unit 114.

Also, when receiving the subtraction command including the amount information from the mobile terminal 11, the control unit 113 reads the electronic value held in the storage unit 114. When an amount shown by the amount information is equal to or less than an amount shown by the read electronic value, the control unit 113 subtracts the amount shown by the amount information from the read electronic value, writes the electronic value back to the storage unit 114, and transmits a subtraction response including the subtraction information showing the subtraction success to the mobile terminal 11.

When the amount shown by the amount information is greater than the amount shown by the read electronic value, the control unit 113 transmits the subtraction response including the subtraction information showing the subtraction failure to the mobile terminal 11.

The storage unit 114 holds the read electronic value based on instruction by the control unit 113.

The CPRM processing unit 112, the control unit 113, and the storage unit 114 are disposed in a TRM (Tamper Resistant Module).

<1.3. IC Tag 14>

The IC tag 14 specifically includes a coiled antenna and an IC chip having a storage area. The coiled antenna receives an electromagnetic wave emitted from the IC tag reader, as a result, an electric field is generated around a periphery of the IC tag 14. An electric potential difference is generated at both ends of the coiled antenna inside the electric field to generate electric current. Thereby, the IC chip becomes operable.

Also, the IC tag reader reads a reflected wave of the electromagnetic wave emitted from the IC tag reader, which is modulated by the IC chip based on the money ticket ID held in the storage area. Thereby, information communication is performed from the IC tag 14 to the IC tag reader.

<1.4. Money Ticket Management Server 15>

The money ticket management server 15 includes a network communication unit 121, a SSL processing unit 122, a storage unit 123, and a control unit 124 as shown in FIG. 2, and is specifically a computer system such as a personal computer and a workstation including a CPU, a ROM, a RAM, a hard disk, and a network interface. A computer program is stored in the ROM. Functions of the money ticket management server 15 are realized by the CPU operating in accordance with the computer program.

The network communication unit 121 is a network interface and its drive circuit, and connects to the network to communicate.

The network communication unit 121, via the network, transmits data instructed by the control unit 124 to a destination instructed by the control unit 124, and transmits data received via the network to the control unit 124.

The SSL processing unit 122, using the SSL, encrypts data to be sent by the network communication unit 121, and decrypts data received by the network communication unit 121.

The storage unit 123 includes a nonvolatile storage area such as a hard disk, and stores money ticket management information including one piece or more of money ticket information in the storage area.

The money ticket information includes an issue ID equivalent to an ID of an issued money ticket, amount information showing an amount of money for the ticket identified by the issue ID, and the status information having a value "0" or "1".

Note that the value "0" indicates that the money ticket identified by the issue ID is an electronic money ticket, whereas the value "1" indicates that the money ticket identified by the issue ID is a paper money ticket.

The control unit 124 performs processing in accordance with the following requests received from a requestor device via the network communication 121 and the SSL processing unit 122: (1) the electronic money ticket conversion request; (2) the paper money ticket conversion request; (3) the status notification request; and (4) the subtraction completion notification. When responding to a result in response to the processings (1) to (3), the control unit 124 transmits the result to the requester device via the network communication 121 and the SSL processing unit 122.

Here, the requestor device may be the mobile terminal 11 and the register device 16.

(1) Electronic Money Ticket Conversion Request

When receiving the electronic money ticket conversion request, the control unit 124 judges whether an issue ID coinciding with a money ticket ID included in the received electronic money ticket conversion request is registered in the money ticket management information. When the coinciding issue ID is not registered, the control unit 124 transmits the electronic money ticket conversion response including the received money ticket ID and the amount information having a value "0" showing the error, to the requestor device.

Also, when the coinciding issue ID is registered, and status information corresponding to the coinciding issue ID has "0" showing an electronic money ticket, the control unit 124 transmits the electronic money ticket conversion response including the received money ticket ID and the amount information having "0", to the requestor device, too.

When the coinciding issue ID is registered, and the status information corresponding to the coinciding issue ID has "1" showing a paper money ticket, the control unit 124 changes the status information corresponding to the issue ID in the money ticket management information to "0" showing an electronic money ticket, and transmits the electronic money ticket conversion response including the received money ticket ID and the amount information corresponding to the issue ID, to the requester device.

(2) Paper Money Ticket Conversion Request

When receiving the paper money ticket conversion request, the control unit 124 judges whether an issue ID coinciding with a money ticket ID included in the received paper money ticket conversion request is registered in the money ticket management information. When the coinciding issue ID is not registered, the control unit 124 transmits the electronic money ticket conversion response including the received money ticket ID and the amount information having "0" showing the error, to the requestor device.

Also, when the coinciding issue ID is registered, and the status information corresponding to the coinciding issue ID has "1" showing a paper money ticket, the control unit 124 transmits the electronic money ticket conversion response including the received money ticket ID and the amount information having "0" showing the error, to the requester device, too.

When the coinciding issue ID is registered, and the status information corresponding to the coinciding issue ID has "0" showing an electronic money ticket, the control unit 124 changes the status information to "1" showing a paper money ticket, and transmits the paper money ticket conversion response including the money ticket ID and the amount information corresponding to the issue ID, to the requester device.

(3) Status Notification Request

When receiving the status notification request, the control unit 124 judges whether an issue ID coinciding with a money ticket ID included in the received status notification request is registered in the money ticket management information. When the coinciding issue ID is not registered, the control unit 124 transmits the status notification response including the received money ticket ID and the amount information having "0" showing the error, to the requestor device.

Also, when the coinciding issue ID is registered, and status information corresponding to the coinciding issue ID has "1" showing a paper money ticket, the control unit 124 transmits the status notification response including the received money ticket ID, amount information corresponding to the issue ID, and the status information having "1" showing a paper money ticket, to the requestor device.

Also, when the coinciding issue ID is registered, and the status information corresponding to the coinciding issue ID has "0" showing an electronic money ticket, the control unit 124 transmits the notification response including the received money ticket ID, the amount information corresponding to the issue ID, and the status information having "0" showing an electronic money ticket, to the requestor device.

(4) Subtraction Completion Notification

The control unit 124 judges whether the subtraction information included in the subtraction completion notification shows the subtraction success. When the subtraction information shows the subtraction success, the control unit 124 changes the status information corresponding to the money ticket ID in the money ticket management information to "1" showing a paper money ticket. When the subtraction information shows the subtraction failure, the control unit 124 terminates the processing.

<1.5. Register Device 16>

The register device 16 includes a bar code reader 131, an operation acquisition unit 132, a display unit 133, a storage unit 134, a radio communication unit 135, a network communication unit 136, a SSL processing unit 137, and a control unit 138 as shown in FIG. 2, and is also structured with a CPU, a ROM, and a RAM and the like as hardware. A computer program is stored in the ROM. Functions of the register device 16 are realized by the CPU operating in accordance with the computer program.

The bar code reader 131 reads each bar code attached to each of the commodities that the user desires to purchase, generates price information showing a selling price of each of the commodities, and transmits the price information to the control unit 138.

The operation acquisition unit 132 includes a circuit that outputs a signal in accordance with a pressing of a keypad and a key, and transmits an operation request, which is the signal in accordance with operation using the keypad by the salesclerk, to the control unit 138.

When the salesclerk presses a calculation instruction key of the keypad, the operation acquisition unit 132 transmits a total calculation request of the price information read by the bar code reader 131, as the operation request, to the control unit 138. Also, when the salesclerk presses an adjustment instruction key of the keypad, the operation acquisition unit 132 transmits the adjustment request, as the operation request, to the control unit 138.

Also, when the salesclerk presses a money ticket adjustment key of the keypad, the operation acquisition unit 132 transmits an adjustment method selection instruction including adjustment method information showing adjustment using a money ticket, as the operation request, to the control unit 138. When the salesclerk presses an electronic value adjustment key of the keypad, the operation acquisition unit 132 transmits adjustment method selection instruction including adjustment method information showing adjustment using an electronic value, as the operation request, to the control unit 138

The display unit 133 specifically includes a display device such as a liquid-crystal display and its drive circuit, and displays a character, a figure, and the like, based on instruction by the control unit 138.

The storage unit 134 holds an electronic value on which addition and subtraction are performed based on control by the control unit 138.

The radio communication unit 135 is specifically an IC tag reader, and performs radio communication with the IC tag 14 using the electric wave of 13.56 MHz band based on instruction by the control unit 138.

Here, a plurality of paper money tickets are collectively covered with a shield made of metal and the like, and only a paper money ticket designed to be read is removed from the shield. The radio communication unit 135 reads the money ticket ID of the removed paper money ticket.

The salesclerk may remove the money ticket designed to be read from the shield. Alternatively, a removing unit for removing the money ticket may be included in the register device 16.

The network communication unit 136 is a network interface and its drive circuit, and connects to the network to communicate.

The network communication unit 136, via the network, transmits data instructed by the control unit 138 to a destination instructed by the control unit 138, and transmits data received via the network to the control unit 138.

The SSL processing unit 137, using the SSL, encrypts data to be sent by the network communication unit 136, and decrypts data received by the network communication unit 136.

Each time receiving the price information from the bar code reader 131, the control unit 138 holds the received price information. When receiving the total calculation request from the operation acquisition unit 132, the control unit 138 acquires the payment amount by totaling amounts shown by the amount information held.

When acquiring the adjustment method information showing either of the adjustment using the money ticket and the adjustment using the electronic value, from the operation acquisition unit 132, the control unit 138 holds the acquired adjustment method information.

Also, when receiving the adjustment request from the operation acquisition unit 132, the control unit 138 references the held adjustment method information.

When the adjustment method information shows the adjustment using the money ticket, the control unit 138 controls payment processing using the money ticket. When the adjustment method information shows the adjustment using the electronic value, the control unit 138 controls payment processing using the electronic value.

(1) Control of Payment Processing Using Money Ticket

The control unit 138 instructs the radio communication unit 135 to transmit an ID reading request to the control unit 138.

The control unit 138 receives the ID reading response including the money ticket ID as a response to the instruction from the IC tag 14 via the radio communication unit 135, and transmits a status notification request including the received money ticket ID to the money ticket management server 15 via the network communication unit 136 and the SSL processing unit 137.

The control unit 138 receives the status notification response including the money ticket ID, the amount information, and the status information corresponding to the money ticket ID, from the money ticket management server 15 via the network communication unit 136 and the SSL processing unit 137, and judges a difference between the payment amount and an amount shown by the amount information is "0", greater than "0", or less than "0".

When the difference is "0", the control unit 138 terminates the processing.

When the difference is less than "0", change is needed. The control unit 138 instructs the display unit 133 to display a change amount that is the difference between the payment amount and the amount shown by the amount information, and transmits an addition request including the change amount to the mobile terminal 11 via the network communication unit 136 and the SSL processing unit 137.

When the difference is greater than "0", the control unit 138 subtracts the amount shown by the amount information from the payment amount, and instructs the display unit 133 to display the subtracted payment amount. And then, the control unit 138 repeats performing the same processing as that described above on a next paper money ticket until a paper money ticket to be read runs out or the payment amount reaches "0".

(2) Control of Payment Processing Using Electronic Value

The control unit 138 transmits the payment request including the payment amount to the mobile terminal 11 via the network communication unit 136 and the SSL processing unit 137, and receives the payment response including the response amount as a response to the request from the mobile terminal 11.

The mobile terminal 11 instructs the display unit 133 to display the response amount, and adds the response amount to the electronic value held in the storage unit 134.

When the mobile terminal 11 does not hold an electronic value enough to pay the payment amount, the response amount shows "0".

OPERATION

As for the operation of the electronic money ticket management system 1, the following classified processes will be described in order:

(1) the process of converting the paper money ticket into the electronic money ticket;

(2) the process of converting the electronic money ticket into the paper money ticket;

(3) the process of inquiring whether the paper money ticket is valid;

(4) the process of performing adjustment using the paper money ticket; and (5) the process of performing adjustment using the electronic money ticket.

In order to make subsequent descriptions brief, though there is no explicit description, it is assumed that, in the mobile terminal 11, when communicating via the network, the control unit 108 communicates via the network communication unit 104 and the SSL processing unit 105, and when communicating with the storage medium 12, the control unit 108 communicates via the CPRM processing unit 106 and the memory communication unit 107.

Likewise, though there is no explicit description, it is assumed that, in the storage medium 12, when communicating with the mobile terminal 11, the control unit 113 communicates via the CPRM processing unit 112 and the I/O unit 111, in the money ticket management server 15, when communicating via the network, the control unit 124 communicates via the network communication unit 121 and the SSL processing unit 122, and in the register device 16, when performing communication via the network, the control unit 138 communicates via the network communication unit 136 and the SSL processing unit 137.

<2.1> Processing of Converting Paper Money Ticket into Electronic Money Ticket

Figure 3:
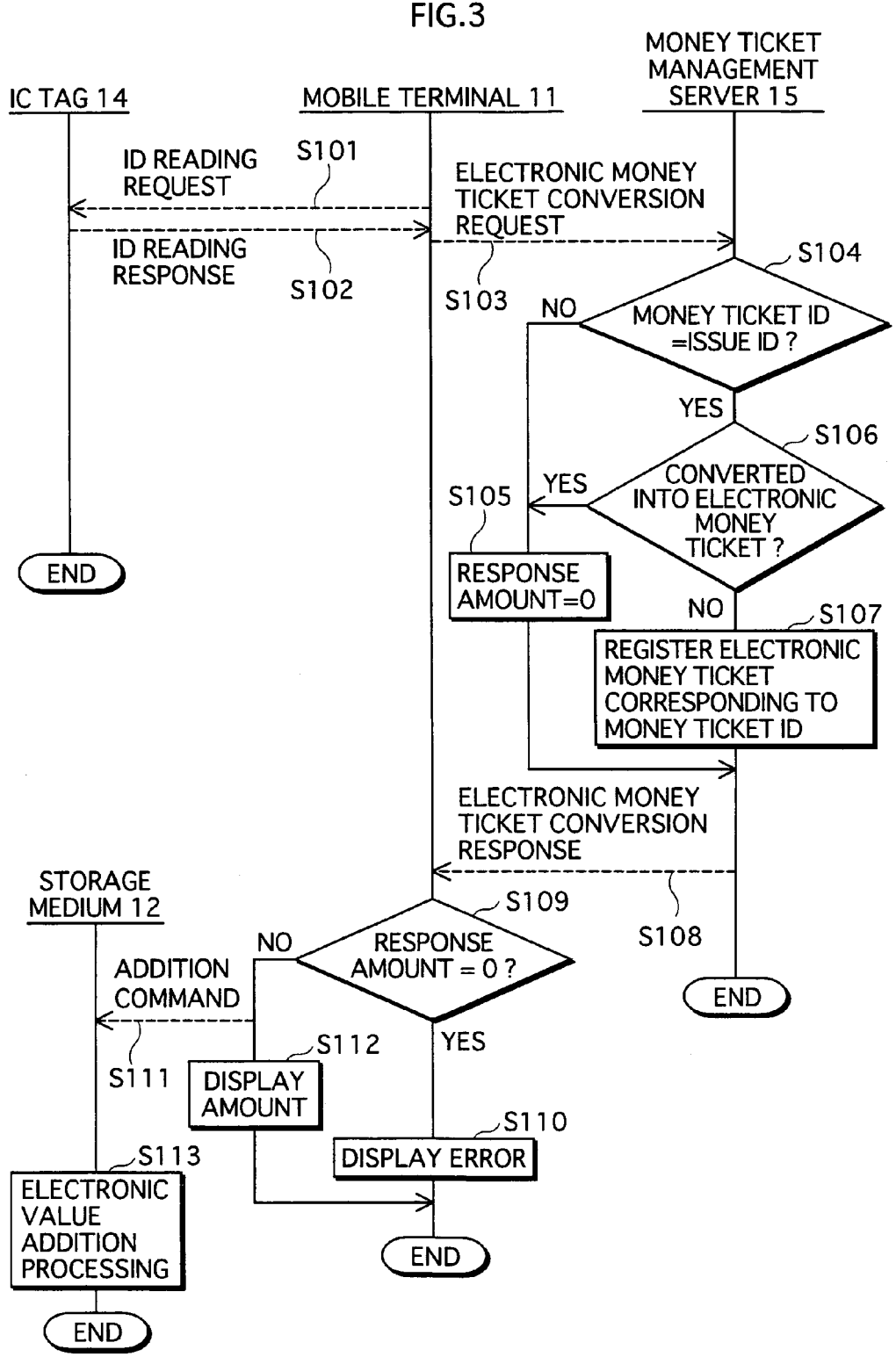
FIG. 3 is a flowchart showing processing operation of converting a paper money ticket into an electronic money ticket according to the embodiment of the present invention.

FIG. 3 is a flowchart showing processing operation of converting the paper money ticket into the electronic money ticket.

The user of the mobile terminal 11 has the money ticket 13 to which the IC tag 14 is attached, and the user desires to convert the money ticket 13 into the electronic money ticket.

The user of the mobile terminal 11 enters an instruction for the electronic money ticket conversion using the keypad of the operation acquisition unit 101. The operation acquisition unit 101 transmits the electronic money ticket conversion request to the control unit 108.

The control unit 108 holds the electronic money ticket conversion request, and instructs the radio communication unit 103 to transmit the ID reading request.

The radio communication unit 103 transmits the ID reading request to the IC tag 14 (S101).

The radio communication unit 103 acquires the ID reading response including the money ticket ID from the IC tag 14, and transmits the acquired ID reading response to the control unit 108 (S102).

While holding the electronic money ticket conversion request, the control unit 108 transmits the electronic money ticket conversion request including the received money ticket ID, to the money ticket management server 15 (S103).

In the money ticket management server 15, the control unit 124 receives the electronic money ticket conversion request from the mobile terminal 11.

The control unit 124 judges whether an issue ID coinciding with the money ticket ID included in the electronic money ticket conversion request is registered in the money ticket management information (S104).

When the coinciding ID is not registered (S104=NO), the control unit 124 sets the amount information as "0" (S105).

When the coinciding ID is registered (S104=YES), the control unit 124 judges whether the status information corresponding to the issue ID has "0" showing an electronic money ticket (S106).

When the corresponding status information shows "0" showing an electronic money ticket (S106=YES), the control unit 124 sets a response amount responding to the mobile terminal 11 as "0" (S105).

When the corresponding status information has other than "0" showing an electronic money ticket (S106=NO), the control unit 124 changes the status information to "0" showing an electronic money ticket, stores the changed status information in the money ticket management information, and reads amount information corresponding to the issue ID as a response amount (S107).

The control unit 124 transmits the electronic money ticket conversion response including the money ticket ID and the response amount, to the mobile terminal 11 (S108).

In the mobile terminal 11, the control unit 108 receives the electronic money ticket conversion response from the money ticket management server 15, and judges whether the response amount included in the electronic money ticket conversion response has "0" (S109).

When the response amount is "0" (S109=YES), the control unit 108 instructs the display unit 102 to display the error showing that the electronic money ticket conversion cannot be performed (S110).

When the response amount is other than "0" (S109=NO), the control unit 108 transmits the addition command including the amount information showing the response amount to the storage medium 12 (S111), and instructs the display unit 102 to display an amount shown by the amount information (S112).

In the storage medium 12, the control unit 113 receives the addition command from the mobile terminal 11, and adds the amount shown by the amount information to the electronic value stored in the storage unit 114 (S113).

<2.2> Processing of Converting Electronic Money Ticket into Paper Money Ticket

Figure 4:
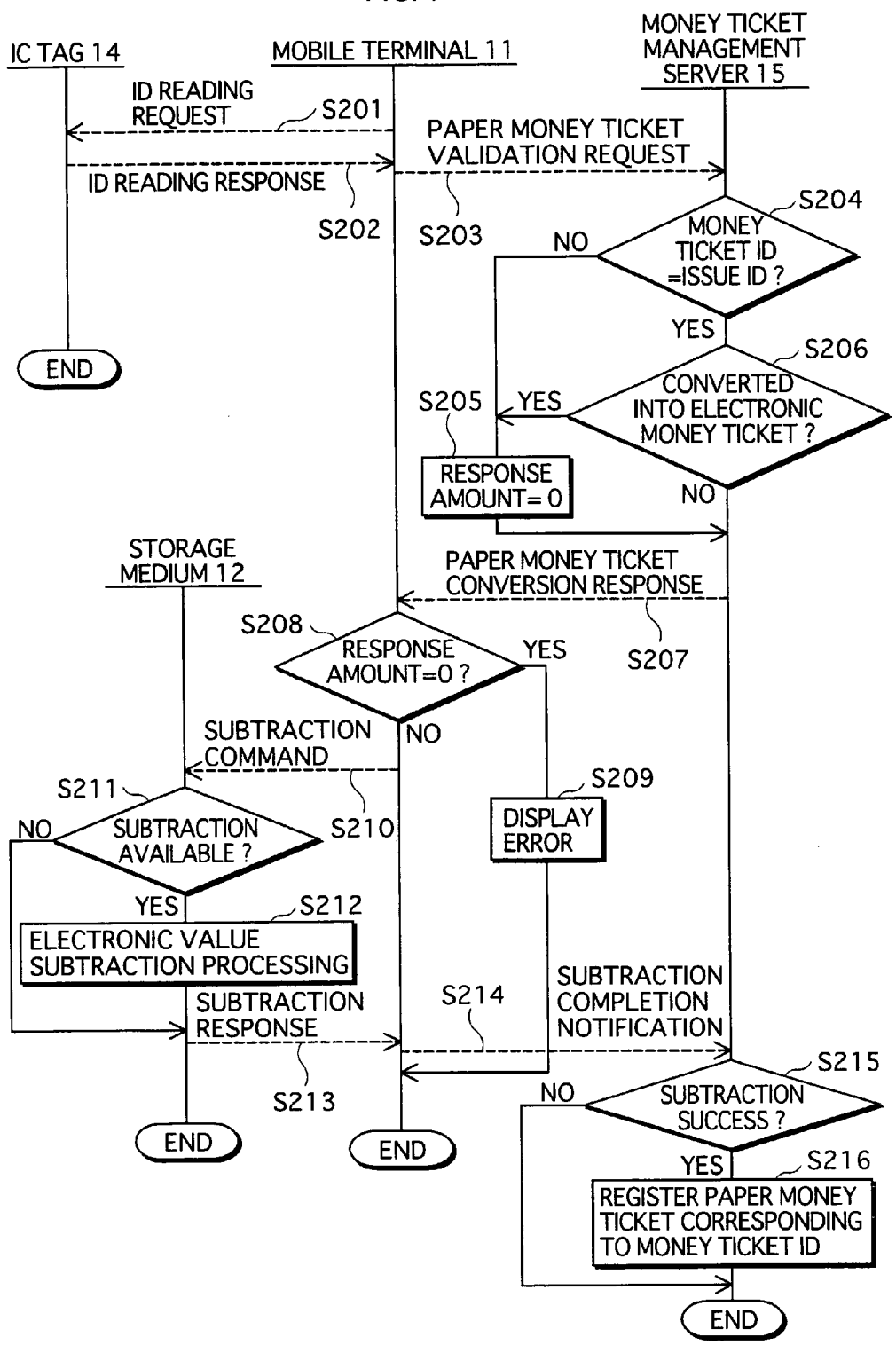
FIG. 4 is a flowchart showing processing operation of validating the paper money ticket according to the embodiment of the present invention.

Here, processing for validating the paper money ticket converted into the electronic money ticket as a paper money ticket will be described. FIG. 4 is a flowchart showing processing operation of validating the paper money ticket. The user of the mobile terminal 11 has the paper money ticket 13 converted into the electronic money ticket. The user enters an instruction for the paper money ticket conversion using the keypad of the operation acquisition unit 101. The operation acquisition unit 101 transmits the paper money ticket conversion request to the control unit 108.

The control unit 108 holds the paper money ticket conversion request, and instructs the radio communication unit 103 to transmit the ID reading request.

The radio communication unit 103 transmits the ID reading request to the IC tag 14 (S201).

The radio communication unit 103 acquires an ID reading response including the money ticket ID from the IC tag 14, and transmits the acquired ID reading response to the control unit 108 (S202).

While holding the paper money ticket conversion request, the control unit 108 transmits the paper money ticket conversion request including the received money ticket ID to the money ticket management server 15 (S203).

In the money ticket management server 15, the control unit 124 receives the paper money ticket conversion request from the mobile terminal 11.

The control unit 124 judges whether an issue ID coinciding with the money ticket ID included in the paper money ticket conversion request is registered in the money ticket management information (S204).

When the coinciding ID is not registered (S204=NO), the control unit 124 sets a response amount as "0" (S205).

When the coinciding ID is registered (S204=YES), the control unit 124 judges whether the status information corresponding to the issue ID has "0" showing an electronic money ticket (S206). When the corresponding status information has "1" showing a paper money ticket (S206=NO), the response amount is equivalent to a face value of the paper money ticket 13.

When the corresponding status information has "0" showing an electronic money ticket (S206=YES), the control unit 124 sets the response amount as "0" (S205).

The control unit 124 transmits the paper money ticket conversion response including the money ticket ID and the response amount to the mobile terminal 11 (S207).

The control unit 108 receives the paper money ticket conversion response from the money ticket management server 15, and judges whether the response amount included in the paper money ticket conversion response is "0" (S208).

When the response amount is "0" (S208=YES), the control unit 108 instructs the display unit 102 to display the error showing that the paper money ticket conversion cannot be performed (S209).

When the response amount is other than "0" (S208=NO), the control unit 108 transmits a subtraction command including the amount information showing the response amount to the storage medium 12 (S210).

The control unit 113 receives the subtraction command from the mobile terminal 11, and judges whether the amount shown by the amount information can be subtracted from the electronic value stored in the storage unit 114 (S211).

When the subtraction can be performed (S211=YES), the control unit 113 subtracts the amount shown by the amount information from the electronic value (S212), and transmits the subtraction completion notification including the subtraction information showing the subtraction success to the mobile terminal 11 (S213).

When the subtraction cannot be performed (S211=NO), the control unit 113 transmits the subtraction response including the subtraction information showing the subtraction failure to the mobile terminal 11 (S213).

The control unit 108 receives the subtraction response from the storage medium 12, and transmits the subtraction completion notification including the money ticket ID and the subtraction information to the money ticket management server 15 (S214).

In the money ticket management server 15, the control unit 124 judges whether the subtraction information included in the subtraction completion notification received from the mobile terminal 11 shows the subtraction success (S215).

When the subtraction information shows the subtraction success (S215=YES), the control unit 122 changes the status information corresponding to the money ticket ID in the money ticket management information to "1" showing a paper money ticket (S216).

When the subtraction information shows the subtraction failure (S215=NO), the money ticket management server 15 terminates the processing.

<2.3. Processing of Inquiring Whether Paper Money Ticket is Valid>

Figure 5:
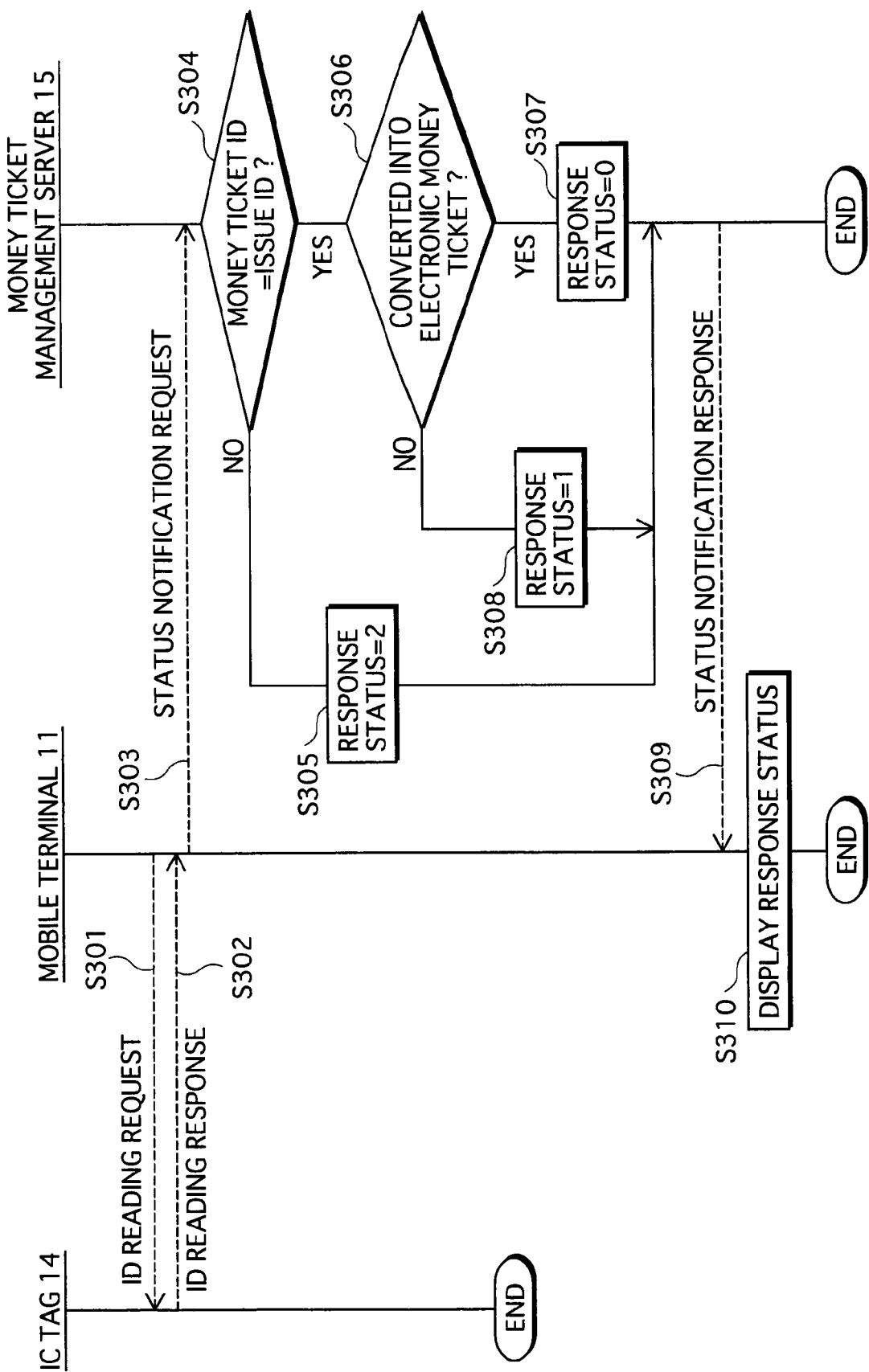
FIG. 5 is a flowchart showing processing operation of inquiring whether the paper money ticket is valid according to the embodiment of the present invention.

FIG. 5 is a flowchart showing processing operation of inquiring whether the paper money ticket is valid and its response.

The user of the mobile terminal 11 enters an instruction for the status notification request using the keypad of the operation acquisition unit 101. The operation acquisition unit 101 transmits the status notification request to the control unit 108.

The control unit 108 holds the status notification request, and instructs the radio communication unit 103 to transmit the ID reading request.

The radio communication unit 103 transmits the ID reading request to the IC tag 14 (S301).

The radio communication unit 103 acquires the ID reading response including the money ticket ID from the IC tag 14, and transmits the acquired ID reading response to the control unit 108 (S302).

While holding the status notification request, the control unit 108 transmits the status notification request including the received money ticket ID to the money ticket management server 15 (S303).

In the money ticket management server 15, the control unit 124 receives the status notification request from the mobile terminal 11.

The control unit 124 judges whether an issue ID coinciding with the money ticket ID included in the electronic money ticket conversion request is registered in the money ticket management information (S304).

When the coinciding issue ID is not registered (S304=NO), the control unit 124 sets a response status as "2" showing no entry (S305).

When the coinciding issue ID is registered (S304=YES), the control unit 124 judges whether status information corresponding to the issue ID has "0" showing an electronic money ticket (S306).

When the corresponding status information has "0" showing an electronic money ticket (S306=YES), the control unit 124 sets the response status as "0" showing an electronic money ticket (S307).

When the corresponding status information has other than "0" showing an electronic money ticket (S306=NO), the control unit 124 sets the response status as "1" showing a paper money ticket (S308).

The control unit 124 transmits the status notification response including the money ticket ID, amount information corresponding to the issue ID, and the response status, to the mobile terminal 11 (S309).

In the mobile terminal 11, the control unit 108 receives the status notification response from the money ticket management server 15, and instructs the display control unit 102 to display the money ticket ID, amount information, and response status included in the acquired status notification response (S310).

By checking the response status displayed on the display control unit 102, the user can find whether the paper money ticket has been electronized.

<2.4. Processing of Performing Adjustment Using Paper Money Ticket>

Figure 6:
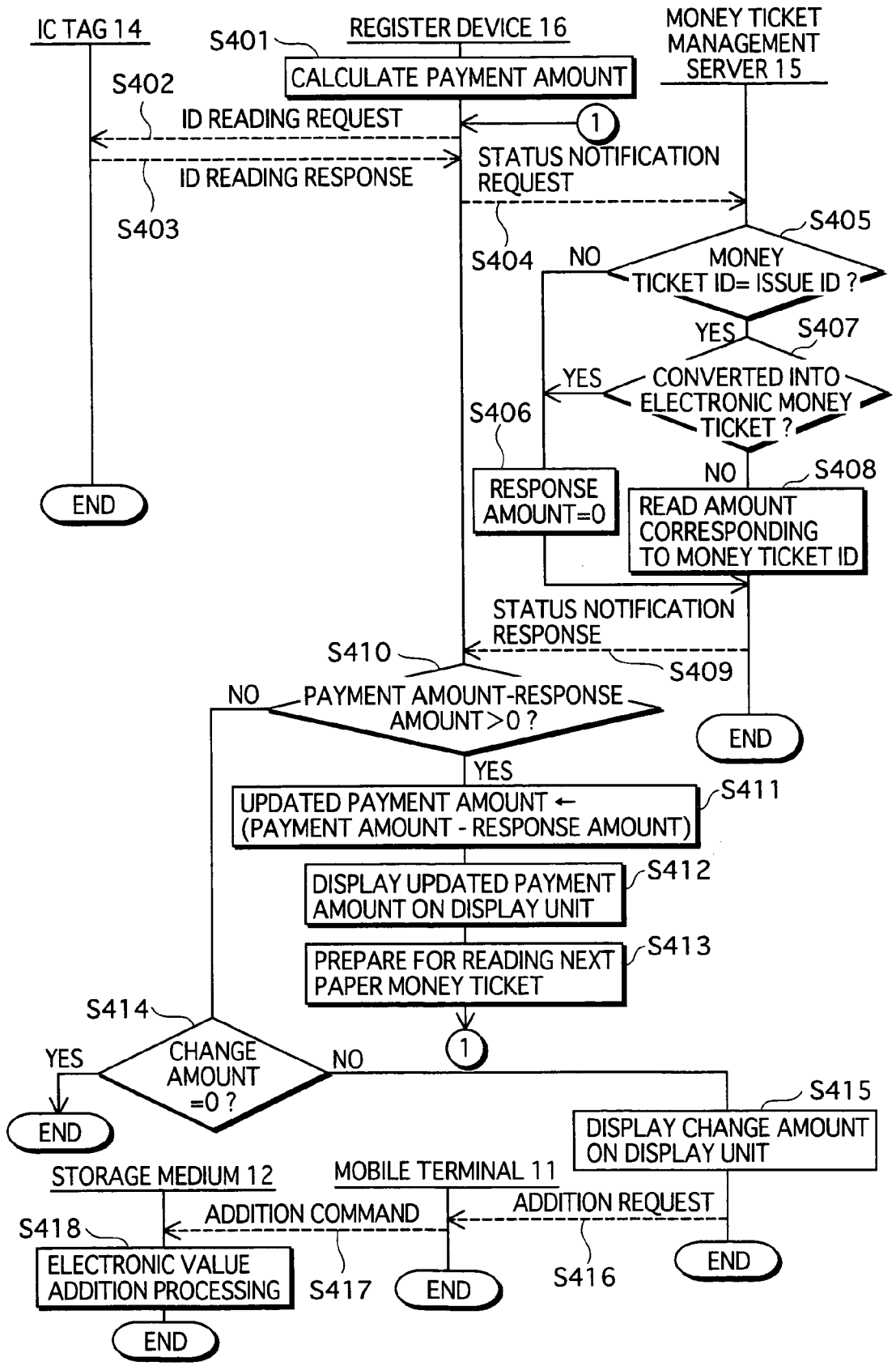
FIG. 6 is a flowchart showing processing operation of performing adjustment using the paper money ticket according to the embodiment of the present invention.

FIG. 6 is a flowchart showing processing operation of performing adjustment using the paper money ticket.

The user passes the commodities to the salesclerk who operates the register device 16.

The salesclerk has the bar code reader 131 read all bar codes attached to the commodities.

The bar code reader 131 generates price information showing selling prices of the commodities based on the read bar codes, and transmits the generated price information to the control unit 138.

The salesclerk enters an instruction for a total calculation request using the keypad of the operation acquisition unit 132. The operation acquisition unit 132 transmits the total calculation request to the control unit 138. Each time receiving the price information from the bar code reader 131, the control unit 138 holds the received price information. When receiving the total calculation request from the operation acquisition unit 132, the control unit 138 acquires a payment amount by totaling amounts shown by the held price information (S401).

The salesclerk presses a paper money ticket adjustment key using the keypad of the operation acquisition unit 132. The operation acquisition unit 132 transmits an adjustment method selection instruction including adjustment method information showing adjustment using the paper money ticket, to the control unit 138.

While the adjustment method information shows the adjustment using the paper money ticket, the control unit 138 judges subsequent adjustment processing would be performed using the paper money ticket, and instructs the radio communication unit 135 to transmit the ID reading request to the IC tag 14. The radio communication unit 135 transmits the ID reading request to the IC tag 14 (S402).

The radio communication unit 135 acquires the ID reading response including the money ticket ID from the IC tag 14, and transmits the acquired ID reading response to the control unit 138 (S403).

The control unit 138 transmits the status notification request including the acquired money ticket ID to the money ticket management server 15 (S404).

In the money ticket management server 15, the control unit 124 receives the status notification request from the register device 16.

The control unit 124 judges whether an issue ID coinciding with the money ticket ID included in the status notification request is registered in the money ticket management information (S405).

When the coinciding issue ID is not registered (S405=NO), the control unit 124 sets a response amount as "0" (S406).

When the coinciding issue ID is registered (S405=YES), the control unit 124 judges whether the status information corresponding to the issue ID has "0" showing an electronic money ticket (S407).

When the corresponding status information has "0" showing an electronic money ticket (S407=YES), the control unit 124 sets the response amount responding to the mobile terminal 11 as "0" (S406).

When the corresponding status information does not have "0" showing an electronic money ticket (S407=NO), the control unit 124 reads the amount information corresponding to the issue ID to the storage unit 123 (S408).

The control unit 124 transmits the status notification response including the money ticket ID, the response amount, and the status information corresponding to the issue ID, to the register device 16 (S409).

In the register device 16, the control unit 138 receives the status notification response from the money ticket management server 15.

The control unit 138 judges whether the payment amount is greater than the response amount included in the received status notification response (S410).

When the payment amount is greater (S410=YES), the control unit 138 updates the payment amount that is a difference between the response amount and the payment amount, stores the payment amount (S411), and instructs the display unit 133 to display the payment amount (S412).

The control unit 138 has the removing unit prepare for reading a next paper money ticket, such as removing a next paper money ticket from the shield (S413), and repeats the processing from S402.

Even when the payment amount does not reach "0", in the case where the user pays the payment amount using not a paper money ticket but cash, and the like, the control unit 138 terminates the processing.

When the payment amount is equal to or less than the response amount included in the received status notification response (S410=NO), the control unit 138 judges whether a change amount that is a difference between the payment amount and the response amount is "0" (S414).

When the change amount is "0" (S414=YES), the control unit 138 terminates the processing.

When the change amount is other than "0" (S414=NO), the control unit 138 instructs the display unit 133 to display the change amount (S415), and transmits the addition request including the change amount to the mobile terminal 11 (S416).

In the mobile terminal 11, the control unit 108 receives the addition request from the register device 16, and transmits the addition command including change information showing the change amount included in the addition request, to the storage medium 12 (S417).

In the storage medium 12, the control unit 113 acquires the addition command from the mobile terminal 11, and adds the change amount shown by the change information included in the addition command to the electronic value stored in the storage unit 114 (S418)<

<2.5. Process of Performing Adjustment Using Electronic Money Ticket>

FIG. 7 is a flowchart showing processing operation of performing adjustment using the electronic money ticket.

The user passes the commodities to purchase to the salesclerk who operates the register device 16.

The salesclerk has the bar code reader 131 read all bar codes attached to the commodities.

The bar code reader 131 generates price information showing selling prices of the commodities based on the read bar codes, and transmits the price information to the control unit 138.

The salesclerk enters an instruction for the total calculation request using the keypad of the operation acquisition unit 132. The operation acquisition unit 132 transmits the total calculation request to the control unit 138. Each time receiving the price information from the bar code reader 131, the control unit 138 holds the received price information. When receiving the total calculation request from the operation acquisition unit 132, the control unit 138 acquires a payment amount by totaling amounts shown by the price information (S501).

The salesclerk presses the electronic value adjustment key using the keypad of the operation acquisition unit 132. The operation acquisition unit 132 transmits the adjustment method selection instruction including the adjustment method information showing the adjustment using the electronic value, to the control unit 138.

As the adjustment method information shows the adjustment using an electronic value, the control unit 138 judges subsequent adjustment processing would be performed using an electronic value.

The control unit 138 transmits a payment request including the payment amount to the mobile terminal 11 (S502).

In the mobile terminal 11, the control unit 108 receives the payment request from the register device 16, and transmits the subtraction command including the amount information showing the payment amount to the storage medium 12 (S503).

In the storage medium 12, the control unit 113 receives the subtraction command from the mobile terminal 11, and judges whether the payment amount shown by the amount information included in the subtraction command is greater than the electronic value stored in the storage unit 114 (S504). When the payment amount is greater (S504=YES), the control unit 113 sets the response amount as "0" (S505).

When the payment amount is equal or less (S504=NO), the control unit 113 subtracts the payment amount from the stored electronic value, and sets the payment amount as the response amount to be sent to the mobile terminal 11 (S506).

The control unit 113 transmits a subtraction response including the response amount to the mobile terminal 11 (S507).

In the mobile terminal 11, the control unit 108 receives the subtraction response, and transmits the payment response including the response amount included in the subtraction response, to the register device 16 (S508).

In the register device 16, the control unit 138 instructs the display unit 133 to display the response amount (S509).

The control unit 138 adds the response amount to the electronic value stored in the storage unit 134 (S510).

MODIFICATION EXAMPLES

While the present invention has been described based on the above exemplary embodiment, the description is not to be constructed as limiting the invention, and various modifications may be applied without departing from the scope of the invention.

The present invention also includes the following cases.

(1) The storage medium 12 is inserted into the card slot included in the mobile terminal 11 to electrically connect with the mobile terminal 11. However, the storage medium 12 may include radio communication means, and may communicate with the mobile terminal 11 using radio.

(2) The IC tag and its reader/writer use the electric wave of 13.56 MHz band, however, electric waves of other frequency bands, such as 135 KHz and 2.45 GHz, may be used without limitation.

(3) The encryption and decryption processes are based on the CPRM format. However, a format for the processes is not limited to the CPRM format.

(4) Upon the adjustment, the register device 16 may invalidate the paper money ticket, and add a face value of the invalidated paper money ticket to the held electronic value.

In this case, the register device 16 transmits an invalidation request of the paper money ticket to the money ticket management server 15.

(5) Upon the adjustment processing using the paper money ticket, the register device 16 acquires the tag ID from the IC tag 14 attached to the paper money ticket 13, and judges whether the paper money ticket 13 has been converted into an electronic money ticket, to the money ticket management server 15. That is, the paper money ticket 13 is passed from the user to the salesclerk of the shop where the register device 16 is installed. However, the adjustment processing may be performed without passing the paper money ticket to the salesclerk.

The mobile terminal 11 acquires the tag ID from the IC tag 14 attached to the paper money ticket 13, and inquires of the money ticket management server 15 whether the paper money ticket 13 has been converted into an electronic money ticket. When a response to the inquiry shows that the paper money ticket 13 has not been converted into an electronic money ticket, the mobile terminal 11 performs the above-described "processing of converting the paper money ticket into an electronic money ticket".

The mobile terminal 11 performs the above-described "processing of performing adjustment using the electronic money ticket" using the electronic value converted into an electronic money ticket to perform the adjustment processing.

(6) When the money ticket ID is stored in the storage unit 123, the money ticket management server 15 may treat the money ticket identified by the money ticket ID as an "electronic money ticket". Whereas, when the money ticket ID is not stored in the storage unit 123, the money ticket management server 15 may treat the money ticket identified by the money ticket ID as a "paper money ticket".

When converting the paper money ticket into an electronic money ticket, the mobile terminal 11 transmits the money ticket ID of the paper money ticket to the money ticket management server 15.

The money ticket management server 15 stores the money ticket ID in the storage unit 123, and transmits the electronic money ticket conversion response to the mobile terminal 11.

When converting the electronic money ticket into a paper money ticket, the mobile terminal 11 transmits the money ticket ID of the paper money ticket to the money ticket management server 15.

The money ticket management server 15 deletes the money ticket ID from the storage unit 123, and transmits the electronic money ticket conversion response to the mobile terminal 11.

Also, the money ticket management server 15 may store identification information that relates to all issued money tickets in correspondence with status of all money tickets (as one example, the status shows selectively a "money ticket" or an "electronic money ticket").

(7) The user of the paper money ticket to which the IC tag is attached may hold the ticket in a wallet shielded with metal and the like while not using the ticket, in order to prevent a terminal of a third person from reading the IC tag.

(8) The amount information relating to the paper money ticket is held in the money ticket management server 15 as the money ticket management information. However, the amount information may be held in a read-only area in the IC tag attached to the paper money ticket.

(9) The IC tag is attached to the paper money ticket. However, instead of or together with this, a bar code may be printed on the paper money ticket.

In this case, in order to prevent counterfeiting of the paper money ticket, the money ticket ID is set in a format of a total of identification information of the money ticket and a value on which secret conversion is performed on the identification information. By judging the money ticket ID as being in the data format, the money ticket ID is confirmed as an unforged value.

Alternatively, when a money ticket ID whose information of the bar code is decrypted coincides with the money ticket ID acquired from the IC tag, the money ticket may be judged as unforged.

In this case, the reader for reading content of the IC tag is replaced with the bar code reader.

Also, both of the IC tag and the bar code may be attached to the paper money ticket.

Furthermore, the money ticket ID may be stored on the money ticket using hologram.

(10) The user of the electronic money ticket management system 1 has the mobile terminal 11 and a plurality of paper money tickets including the paper money ticket 13. When purchasing commodities at the shop such as the supermarket where the register device 16 is installed, the user may pay a part of the payment of the commodities using the paper money ticket 13, and pay a rest of the payment using the electronic value held in the mobile terminal 11.

(11) The exemplary embodiment has been described using the mobile terminal device. However, a terminal device is not limited to be mobile.

A stationery terminal device may be used, such as a desktop personal computer having a function equivalent to that of the mobile terminal device.

(12) A method for storing the money ticket ID in the paper money ticket is not limited to the bar code format. The storage may be performed by combining all or a part of methods using the hologram, special ink unavailable for printing by copy, and the like.

(13) The exemplary embodiment has been described for the mutual conversion between the paper money ticket and the electronic money ticket. However, a ticket not having monetary value may be also used for the mutual conversion.

The mutual conversion may be performed between the electronic value and a ticket, such as a coupon ticket, a beer ticket, a discount ticket, and a train ticket.

Also, the exemplary embodiment has been described with the example using the paper money ticket. However, instead of the paper money ticket, a money ticket made of plastic sheet, metal sheet, glass, vinyl, and the like, may be used, unless rewritable.

(14) The present invention may be the above methods. Also, the present invention may be a computer program that realizes the methods by a computer, and may be a digital signal composed of the computer program.

Furthermore, the present invention may be a computer readable storage medium such as a flexible disc, a hard disk, a CD-ROM (Compact Disc Read Only Memory), a MO (Magneto Optical Disc), a DVD (Digital Versatile Disc), a DVD-ROM (Digital Versatile Disc Read Only Memory), a DVD-RAM (Digital Versatile Disc Random Access Memory), a BD (Blu-ray Disc), a semiconductor memory, that stores the computer program or the digital signal. Also, the present invention may be the computer program or the digital signal stored in these storage media.

Also, the present invention may be the computer program or the digital signal transmitted via an electric communication line, a radio or cable communication line, a network represented by Internet, and the like.

Also, the present invention may be a computer system including a microprocessor and a memory, the memory storing the computer program, and the microprocessor operating in accordance with the computer program.

Also, by transferring the computer program or the digital signal stored to the storage medium, or by transferring the computer program or the digital signal via a network and the like, the program or the digital signal may be executed by another independent computer system.

(15) All or part of the compositional elements of each device may be composed from one system LSI (Large Scale Integration). The system LSI is a super-multifunctional LSI on which a plurality of compositional units are manufactured integrated on one chip, and is specifically a computer system including a microprocessor, a ROM, a RAM, and the like. A computer program is stored in the RAM. Functions of the system LSI are realized by the microprocessor operating in accordance with the computer program.

(16) The present invention may be any combination of the above-described exemplary embodiment and modifications.

INDUSTRIAL APPLICABILITY

A ticket management system and a value conversion method of the present invention are used in an industry treating an electronic commerce system using an electronic value. A mobile terminal, a ticket management server, and a register device of the present invention are manufactured and sold by a manufacturer of digital appliances or personal computers, office equipments, and the like.

The invention claimed is:

1. A ticket management system including a terminal device and a ticket management server, the terminal device comprising:

a reading unit for reading an electronic value stored in a storage unit, the electronic value being electronically represented value information;

an acquisition unit for acquiring, from a ticket to which non-updatable value information is assigned, identification information which identifies the ticket;

a transmission unit for transmitting an electronization request that is a request to convert the non-updatable value information into another electronic value and includes the acquired identification information, to the ticket management server; and a value update unit for updating the electronic value stored in the storage unit so as to show value information calculated based on the non-updatable value information corresponding to the identification information and the value information shown by the electronic value stored in the storage unit, and the ticket management server comprising:

a status storage unit for storing the identification information and status information showing whether the ticket identified by the identification information has been electronized, in correspondence with each other;

a reception unit for receiving the electronization request from the terminal device; and a change unit, when the status information corresponding to the identification information included in the electronization request shows that the ticket has not been electronized, for changing the status information to show that the ticket has been electronized.

2. A terminal device for converting a ticket to which non-updatable value information is assigned into an electronic value, and being used with a ticket management server which manages electronization of the ticket identified by identification information, the terminal device comprising:

a reading unit for reading an electronic value stored in a storage unit, the electronic value being electrically represented value information;

an acquisition unit for acquiring the identification information which identifies the ticket, from the ticket;

a transmission unit for transmitting an electronization request that is a request to convert the non-updatable value information into an electronic value and includes the acquired identification information, to the ticket management server; and a value update unit for updating the electronic value stored in the storage unit so as to show value information calculated based on the non-updatable value information corresponding to the identification information and the value information shown by the electronic value stored in the storage unit.

3. The terminal device of claim 2, wherein the value update unit comprises:

a write judgment unit for judging whether the ticket identified by the acquired identification information is valid;

a value acquisition unit for acquiring another electronic value shown by the non-updatable value information when the ticket is valid; and a value updating unit for updating the electronic value stored in the storage unit to an electronic value calculated based on the acquired other electronic value and the electronic value stored in the storage unit.

4. The terminal device of claim 3, wherein the write judgment unit comprises:

a receiving unit for receiving electronization information, showing whether the ticket identified by the identification information has been electronized, from the ticket management server; and a determination unit for determining the ticket as valid when the electronization information shows that the ticket has not been electronized.

5. The terminal device of claim 3, wherein judgment information based on the identification information is stored on the ticket, and the write judgment unit comprises:
a judgment information acquisition unit for acquiring the judgment information; and
a determination unit for determining the ticket as valid when the identification information coincides with the judgment information.

6. The terminal device of claim 5, wherein the judgment information is stored on the ticket in a bar code format, and the judgment information acquisition unit acquires the judgment information stored in the bar code format.

7. The terminal device of claim 3, wherein the value acquisition unit includes:
a request unit for requesting the ticket management server to notify the non-updatable value information by transmitting a notification request including the identification information when the ticket is judged as valid; and
a response acquisition unit for receiving, as a response to the notification request, the non-updatable value information from the ticket management server, and acquiring the other electronic value shown by the non-updatable value information.

8. The terminal device of claim 3, wherein the identification information includes the non-updatable value information, and the value acquisition unit, when the ticket is judged as valid, extracts the non-updatable value information from the identification information, and acquires the other electronic value shown by the non-updatable value information.

9. The terminal device of claim 2, wherein the ticket includes a storage device storing the identification information, and the acquisition unit acquires the identification information stored in the storage device.

10. The terminal device of claim 9, wherein the storage device is an integrated circuit tag storing the identification information, and the acquisition unit acquires the identification information stored in the integrated circuit tag.

11. The terminal device of claim 2, wherein the identification information is stored on the ticket in a bar code format, and the acquisition unit acquires the identification information stored in the bar code format.

12. A terminal device that is used with a ticket management server which manages a status of a ticket to which non-updatable value information is assigned, the terminal device comprising:
an invalidation identification acquisition unit for acquiring identification information which identifies an invalid ticket;
an invalid value acquisition unit for acquiring an invalid value, the invalid value being an electronic value that is electronically represented non-updatable value information assigned to the invalid ticket;
a balance judgment unit for judging whether the invalid value is no more than another electronic value stored in a storage unit;
a validation request transmission unit for transmitting a validation request of the ticket to the ticket management server when the invalid value is judged as no more than the other electronic value stored in the storage unit;
an authorization reception unit for receiving authorization information for authorizing validation of the ticket from the ticket management server; and a subtraction unit for subtracting the invalid value from the other electronic value stored in the storage unit when the authorization information is received.

13. The terminal device of claim 12 further comprising:
a reading unit for reading the other electronic value stored in the storage unit;
an acquisition unit for acquiring identification information which identifies the ticket, from the ticket;
a transmission unit for transmitting an electronization request that is a request to convert the non-updatable value information into an electronic value and includes the acquired identification information, to the ticket management server; and
a value update unit for updating the other electronic value stored in the storage unit so as to show value information calculated based on the non-updatable value information and the value information shown by the electronic value stored in the storage unit.

14. A ticket management server which manages a status of a ticket to which non-updatable value information is assigned, the ticket management server comprising:
a status storage unit storing identification information which identifies the ticket and status information showing whether the ticket identified by the identification information has been electronized, in correspondence with each other;
a validation request receiving unit for receiving a ticket validation request including identification information of an invalid ticket from a terminal device;
an electronization judgment unit for judging whether status information corresponding to the identification information included in the validation request shows that the ticket has been electronized;
a ticket validation unit for changing the status information to show that the ticket has not been electronized when the status information shows that the ticket has been electronized; and
an authorization transmission unit for transmitting authorization information showing authorization to validate the ticket to the terminal device when the status information shows that the ticket has been electronized.

15. The ticket management server of claim 14, further comprising:
a reception unit for receiving an electronization request that includes the identification information which identifies the ticket, from the terminal device; and
a change unit for changing the status information corresponding to the identification information stored in the status storage unit, to show that the ticket has been electronized when the ticket identified by the identification information included in the electronization request is valid.

16. The ticket management server of claim 15, wherein the change unit includes:
a judgment unit for judging whether the status information included in the electronization request shows that the ticket has been electronized; and
a changing unit for determining the identification information as valid, and changing the status information to show that the ticket has been electronized when the ticket is judged as not having been electronized.

17. A register device for adjusting a payment amount, and being used with a ticket management server which manages validity of a money ticket and a terminal device, the register device comprising:
a calculation unit for calculating the payment amount;

a holding unit for holding a money ticket identification for identifying the money ticket and amount information showing an amount of the money ticket, in correspondence with each other;

an acquisition unit for acquiring, from an integrated circuit tag attached to the money ticket, the money ticket identification for identifying the money ticket;

an inquiry unit for inquiring of the ticket management server whether the acquired money ticket identification is valid;

a receiving unit for receiving a response showing whether the money ticket identified by the acquired money ticket identification is valid, from the ticket management server; and a charging unit, when the response shows that the money ticket is valid, for charging the terminal device for an amount after subtracting the amount of the money ticket identified by the acquired the money ticket identification from the payment amount.

18. A value conversion method used in a terminal device that converts a ticket to which non-updatable value information is assigned into an electronic value, the method comprising:

reading an electronic value stored in a storage unit, the electronic value being electrically represented value information;

acquiring identification information, which identifies the ticket, from the ticket;

transmitting an electronization request that is a request to convert the non-updatable value information into an electronic value and includes the acquired identification information, to a ticket management server which manages electronization of the ticket; and updating the electronic value so as to show value information calculated based on the non-updatable value information corresponding to the identification information and the value information shown by the electronic value stored in the storage unit.

19. A computer program used in a terminal device that converts a ticket to which non-updatable value information is assigned into an electronic value, the program comprising:

reading an electric value stored in a storage unit the electronic value being electrically represented value information;

acquiring identification information, which identifies the ticket, from the ticket;

transmitting an electronization request that is a request to convert the non-updatable value information into an electronic value and includes the acquired identification information, to a ticket management server which manages electronization of the ticket; and updating the electronic value so as to show value information calculated based on the non-updatable value information corresponding to the identification information and the value information shown by the electronic value stored in the storage unit.

20. A computer readable storage medium storing the computer program of claim 19.

21. A terminal device for converting a ticket to which non-updatable value information is assigned into an electronic value, and being used with a ticket management server which manages electronization of the ticket identified by identification information, the terminal device comprising:

an electronic value storage unit storing the electronic value;

an acquisition unit for acquiring the identification information which identifies the ticket, from the ticket;

a transmission unit for transmitting an electronization request including the acquired identification information, to the ticket management server;

a value update unit for updating the electronic value stored in the electronic value storage unit, by adding an electronic value shown by the value information assigned to the ticket corresponding to the identification information;

an invalidation identification acquisition unit for acquiring identification information which identifies an invalid ticket;

an invalid value acquisition unit for acquiring an invalid value that is another electronic value shown by value information assigned to the invalid ticket identified by the acquired identification information;

a balance judgment unit for judging whether the invalid value is no more than the electronic value stored in the electronic value storage unit;

a validation request transmission unit, when the invalid value is judged as no more than the electronic value stored in the electronic value storage unit, for transmitting a validation request of the ticket to the ticket management server;

an authorization reception unit for receiving authorization information for authorizing validation of the ticket from the ticket management server; and a subtraction unit, when the authorization information is received, for subtracting the invalid value from the electronic value stored in the electronic value storage unit.

22. A ticket management server which manages a status of a ticket to which non-updatable value information is assigned, the ticket management server comprising:

a status storage unit storing identification information which identifies the ticket and status information showing whether the ticket identified by the identification information has been electronized, in correspondence with each other;

a reception unit for receiving an electronization request including the identification information of the ticket, from a terminal device;

a change unit for changing, when the ticket identified by the identification information included in the electronization request is valid, the status information corresponding to the identification information stored in the status storage unit, to show that the ticket has been electronized;

a validation request receiving unit for receiving a ticket validation request including identification information of an invalid ticket from a terminal device;

an electronization judgment unit for judging whether status information corresponding to the identification information included in the validation request shows that the ticket has been electronized;

a ticket validation unit for changing, when the status information shows that the ticket has been electronized, the status information to show that the ticket has not been electronized; and an authorization transmission unit for transmitting, when the status information shows that the ticket has been electronized, authorization information showing authorization to validate the ticket to the terminal device.

* * * * *